(12) United States Patent
Yanagita et al.

(10) Patent No.: US 11,794,340 B2
(45) Date of Patent: Oct. 24, 2023

(54) ROBOT CONTROLLER

(71) Applicant: FANUC CORPORATION, Yamanashi (JP)

(72) Inventors: Akihiro Yanagita, Yamanashi (JP); Takahiro Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 246 days.

(21) Appl. No.: 17/099,029

(22) Filed: Nov. 16, 2020

(65) Prior Publication Data

US 2021/0170578 A1 Jun. 10, 2021

(30) Foreign Application Priority Data

Dec. 10, 2019 (JP) ................................ 2019-222862

(51) Int. Cl.
*B25J 9/16* (2006.01)
(52) U.S. Cl.
CPC ............. *B25J 9/161* (2013.01); *B25J 9/1656* (2013.01)
(58) Field of Classification Search
CPC ... B25J 9/161; B25J 9/1656; B25J 9/16; B25J 9/0081; B25J 9/1602; B25J 9/1679
USPC .................. 700/245–264; 318/568.11–568.25
See application file for complete search history.

(56) References Cited

U.S. PATENT DOCUMENTS

| | | | | |
|---|---|---|---|---|
| 3,419,849 A * | 12/1968 | Anderson | G06F 9/4812 | 710/49 |
| 5,019,763 A * | 5/1991 | Komatsu | G05B 19/416 | 700/193 |
| 5,652,865 A * | 7/1997 | Rawlings, III | G06F 3/0658 | 711/170 |
| 5,974,503 A * | 10/1999 | Venkatesh | G06F 11/2023 | 714/E11.073 |
| 6,029,168 A * | 2/2000 | Frey | G06F 16/10 | |
| 6,205,528 B1 * | 3/2001 | Kingsbury | G06F 12/1072 | 711/170 |
| 6,487,713 B1 * | 11/2002 | Cohen | G06F 8/71 | 717/105 |
| 6,990,657 B2 * | 1/2006 | Hunter | G06F 11/364 | 717/124 |
| 7,089,531 B2 * | 8/2006 | Rutkowski | G05B 19/4093 | 717/113 |
| 7,278,133 B2 * | 10/2007 | Roman | G06F 8/00 | 717/121 |

(Continued)

FOREIGN PATENT DOCUMENTS

JP S63-256381 A 10/1988
JP 2000-242475 A 9/2000

(Continued)

*Primary Examiner* — Jaime Figueroa
(74) *Attorney, Agent, or Firm* — Studebaker & Brackett PC

(57) ABSTRACT

A robot controller includes a memory unit that stores an address table that contains a plurality of start addresses for additional system software files each used to add a function to system software for the robot controller, and a function addition portion that adds a function to the system software based on an additional function file stored in an external memory device. The function addition portion uses an index value with respect to the address table to acquire one of the start addresses for the additional system software files. Programs contained in the system software and the additional system software files each use a position-independent code based on relative addressing.

7 Claims, 3 Drawing Sheets

(56) References Cited

U.S. PATENT DOCUMENTS

| | | | | |
|---|---|---|---|---|
| 7,620,477 | B2* | 11/2009 | Bruemmer | G05D 1/0088 700/262 |
| 7,801,644 | B2* | 9/2010 | Bruemmer | G06N 3/008 318/568.17 |
| 8,230,394 | B2* | 7/2012 | Clemenceau | G06F 9/44505 717/124 |
| 8,543,972 | B2* | 9/2013 | Chen | G06F 16/958 717/121 |
| 9,195,233 | B2* | 11/2015 | Perrone | G05D 1/0088 |
| 9,709,970 | B2* | 7/2017 | Kubota | G06F 21/10 |
| 9,833,901 | B2* | 12/2017 | Perrone | G05D 1/0088 |
| 10,127,622 | B2* | 11/2018 | Nishitani | B25J 9/1697 |
| 10,331,136 | B2* | 6/2019 | Perrone | B25J 9/1661 |
| 10,642,254 | B2* | 5/2020 | Koyama | G05B 19/4155 |
| 11,314,251 | B2* | 4/2022 | Perrone | G05D 1/0088 |
| 11,531,648 | B2* | 12/2022 | Smith | G06F 16/178 |
| 2002/0100024 | A1* | 7/2002 | Hunter | G06F 11/364 717/129 |
| 2002/0156974 | A1* | 10/2002 | Ulrich | G06F 16/10 711/170 |
| 2004/0039484 | A1* | 2/2004 | Watanabe | G05B 19/41835 700/245 |
| 2005/0262512 | A1* | 11/2005 | Schmidt | G06F 9/465 719/310 |
| 2006/0020689 | A1* | 1/2006 | Roman | G06F 8/00 709/220 |
| 2006/0150188 | A1* | 7/2006 | Roman | G06F 9/4887 718/104 |
| 2006/0229760 | A1* | 10/2006 | Suzuki | G05B 19/4148 700/169 |
| 2007/0208442 | A1* | 9/2007 | Perrone | G05D 1/0088 700/95 |
| 2008/0009967 | A1* | 1/2008 | Bruemmer | G05D 1/0088 700/245 |
| 2008/0009968 | A1* | 1/2008 | Bruemmer | G06N 3/008 700/245 |
| 2009/0271708 | A1* | 10/2009 | Peters | G06Q 10/10 715/738 |
| 2015/0081047 | A1* | 3/2015 | Kubota | G05B 15/02 700/40 |
| 2016/0078583 | A1* | 3/2016 | Nishitani | H04N 5/23229 348/207.1 |
| 2016/0221186 | A1* | 8/2016 | Perrone | B25J 9/1661 |
| 2016/0253497 | A1* | 9/2016 | Christodorescu | G06F 21/52 726/23 |
| 2017/0034023 | A1* | 2/2017 | Nickolov | H04L 43/0817 |
| 2018/0095467 | A1* | 4/2018 | Perrone | B25J 9/1661 |
| 2019/0033830 | A1* | 1/2019 | Koyama | G05B 19/4155 |
| 2020/0026285 | A1* | 1/2020 | Perrone | B25J 9/1661 |

FOREIGN PATENT DOCUMENTS

| | | |
|---|---|---|
| JP | 2001-350509 A | 12/2001 |
| JP | 2005-322232 A | 11/2005 |
| JP | 2007-528630 A | 10/2007 |
| JP | 2012-141687 A | 7/2012 |
| JP | 2015-150636 A | 8/2015 |
| JP | 2018-523882 A | 8/2018 |
| JP | 2018-529140 A | 10/2018 |

\* cited by examiner

ROBOT CONTROLLER

This application is based on and claims the benefit of priority from Japanese Patent Application No. 2019-222862, filed on 10 Dec. 2019, the content of which is incorporated herein by reference.

BACKGROUND OF THE INVENTION

Field of the Invention

The present invention relates to a robot controller.

Related Art

Conventionally, a robot controller uses system software to control a robot. The system software is stored in a memory unit such as a memory in the robot controller (for example, see Japanese Unexamined Patent Application, Publication No. 2015-150636).

Patent Document 1: Japanese Unexamined Patent Application, Publication No. 2015-150636

SUMMARY OF THE INVENTION

To add a new function to existing system software for a robot controller, it is necessary to delete the existing system software, and then add, to the robot controller, the system software having the new function.

However, to newly add system software, robot programs and calculated data such as setting data are stored separately in an external memory device or a similar device, and are then read again in a memory unit in the robot controller after the system software has been added.

For such system software having a new function as described above, a longer time is taken to install the entire system software, and to read calculated data. Therefore, there has been a demand for a robot controller to which a new function can be added more easily.

A robot controller according to an aspect of the present disclosure is a robot controller that controls a robot. The robot controller includes a memory unit that stores an address table that contains a plurality of start addresses for additional system software files each used to add a function to system software for the robot controller, and a function addition portion that adds a function to the system software based on an additional function file stored in an external memory device. The function addition portion uses an index value with respect to the address table to acquire one of the start addresses for the additional system software files. Programs contained in the system software and the additional system software files each use a position-independent code based on relative addressing.

With the present invention, it is possible to add a new function more easily.

DETAILED DESCRIPTION OF THE INVENTION

Figure 1:
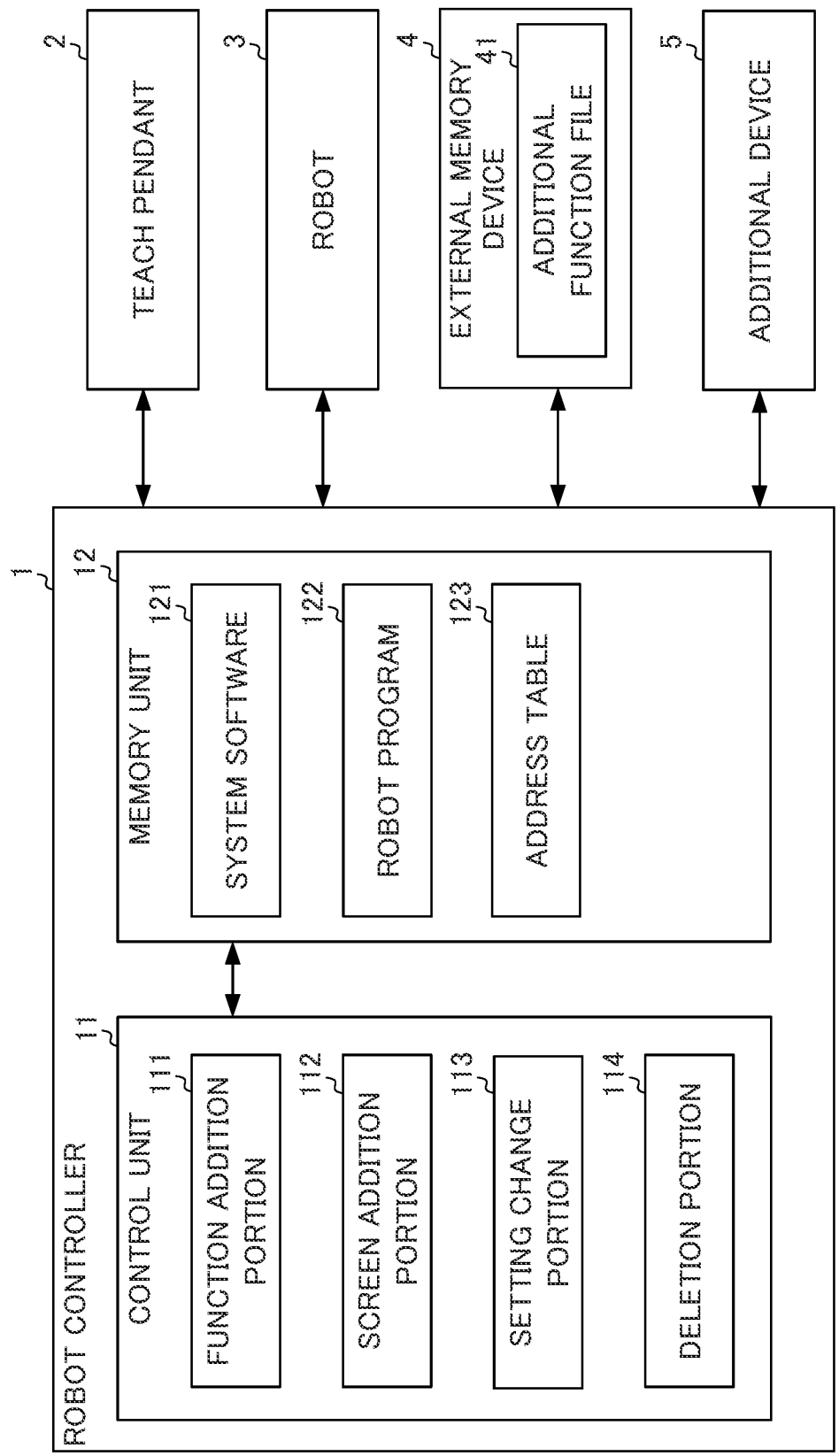
FIG. 1 is a block diagram showing a configuration of a robot controller.
Figure 2:
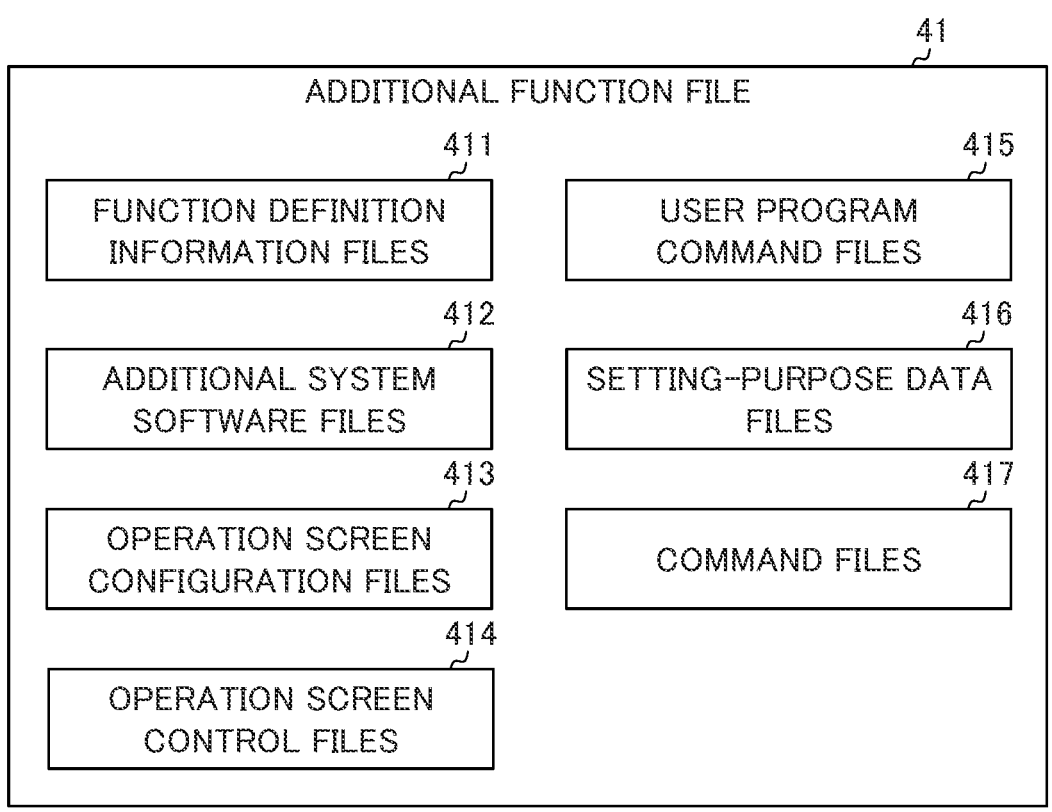
FIG. 2 is a view showing a configuration of an archive file.

An example of an embodiment of the present invention will now be described herein. A robot controller 1 is coupled to a robot 3, and executes various types of processing to control the robot 3.

A teach pendant 2 represents a display-and-input device that includes a display and a hardware key, for example. The teach pendant 2 is coupled to the robot controller 1. An operator operates the teach pendant 2 to execute calculation, correction, and registration of a robot program, to set various types of parameters, to run a taught robot program, and to perform manual operations for robot positioning, for example.

The robot 3 is coupled to the robot controller 1, and operates according to control by the robot controller 1. An external memory device 4 represents a memory device that is connectable to the robot controller 1, such as a USB (universal serial bus) memory or a CF (compact flash) card. The external memory device 4 stores an additional function file 41, for example.

An additional device 5 represents hardware that adds a function to the robot 3, such as a robot hand. The additional device 5 is associated with the additional function file 41 in the external memory device 4. The additional function file 41 and the additional device 5 are used to add a new function to the robot controller 1 and the robot 3.

The robot controller 1 includes a control unit 11 and a memory unit 12. The control unit 11 represents a processor such as a CPU (central processing unit) that executes programs stored in the memory unit 12 to serve as a function addition portion 111, a screen addition portion 112, a setting change portion 113, and a deletion portion 114.

The memory unit 12 includes a ROM (read only memory), a RAM (random access memory), a non-volatile memory, and a hard disk drive, for example, to store various types of data.

For example, system software used to control the robot 3 and system software used for image processing are stored in the ROM in the memory unit 12. A robot program used to teach work contents to the robot in accordance with an application, and its related setting data are stored in the non-volatile memory in the memory unit 12. The RAM in the memory unit 12 serves as a memory region used to temporarily store data that the control unit 11 uses for various types of arithmetic processing.

The memory unit 12 stores system software 121, a robot program 122, and an address table 123. The system software 121 represents system software used to control the robot 3. The robot program 122 represents a program that causes the robot 3 to execute various types of operations.

The address table 123 contains a plurality of start addresses (entry points) for additional system software files each used to add a function to the system software 121 for the robot controller 1. An index value with respect to the address table can be used to acquire an entry point value. Since the additional system software files to be added are each assigned a unique index values, the robot controller 1 can use one of the index values to call newly-added system software.

The additional function file 41 stored in the external memory device 4 contains files each used to add a function to the system software 121. The files constitute an archive file that is a single file containing a plurality of programs and a plurality of data files.

The additional function file 41 contains function definition information files 411, additional system software files 412, operation screen configuration files 413, operation screen control files 414, user program command files 415, setting-purpose data files 416, and command files 417.

The function definition information files 411 each contain definition information (name, version number, ID name, description of function, for example). The function definition information files 411 are respectively registered as entries in an additional function database added to the memory unit 12. For example, the function addition portion 111 in the control unit 11 causes the teach pendant 2 for the robot controller 1 to display a list of functions to be added based on the data in the additional function database.

The additional function file 41 further contains identification information for functions to be added. Therefore, the control unit 11 can discriminate an added function from other functions.

The additional system software files 412 each represent a file that contains a machine code that the control unit 11 in the robot controller 1 can execute. Note that the programs contained in the system software 121 and the additional system software files 412 each use a position-independent code based on relative addressing. The relative addressing is referred to as a method of specifying an address with a relative distance from a certain address. Therefore, the robot controller 1 can load a program at a desired address in the memory unit 12 for execution.

The operation screen configuration files 413 and the operation screen control files 414 represent files each used to add an operation screen on the teach pendant 2 for the robot controller 1. The operation screen configuration files 413 and the operation screen control files 414 are registered in a screen control database added in the memory unit 12.

The user program command files 415 each represent a file used to add a new robot command. The setting-purpose data files 416 each represent a file used to cause the robot controller 1 to change settings for the robot 3. The command files 417 each represent a file that contains commands causing the robot controller 1 to perform various types of processing (file operations and system setting operations, for example).

Next, controls by the control unit 11 will be described below. The function addition portion 111 adds a function to the system software 121 based on the additional function file 41 stored in the external memory device 4. For example, the function addition portion 111 may selectively add a function to the system software based on the additional function file 41. Specifically, when the external memory device 4 is coupled to the robot controller 1, the function addition portion 111 causes the teach pendant 2 for the robot controller 1 to display a list of additional functions based on the function definition information files 411.

Upon selection of an additional function through an operation on the teach pendant 2, the function addition portion 111 introduces the selected additional function from the additional function file 41 into the robot controller 1. The introduction of the additional function is executed through such processing as described below, for example.

(a) The function addition portion 111 deploys one of the files contained in the additional function file 41 into the RAM in the memory unit 12.

(b) The function addition portion 111 reads function information (ID name and version number, for example) from one of the corresponding function definition information files 411, and secures a region (function introduction region) used to store the additional function in the non-volatile memory in the memory unit 12. The function addition portion 111 uses the ID name of the additional function as a name of the function introduction region.

(c) The function addition portion 111 fully copies the file deployed in the memory unit 12 to the secured function introduction region, and then deletes the deployed file.

(d) The control unit 11 executes processing corresponding to each of the files contained in the additional function file 41.

(e) After the processing has been fully completed, and the robot controller 1 is started again, the robot controller 1 can execute the additional function.

The screen addition portion 112 adds a new graphical user interface (GUI) screen to the system software 121 based on one of the operation screen configuration files 413 and one of the operation screen control files 414. For example, the screen addition portion 112 adds to the system software 121 a new GUI screen used to operate the additional device 5, based on the one of the operation screen configuration files 413 and the one of the operation screen control files 414. Therefore, a user can use the teach pendant 2 to operate the additional device 5.

The setting change portion 113 changes system settings for the system software 121 based on each of the setting-purpose data files 416 and each of the command files 417. For example, the setting change portion 113 changes the system settings of the system software 121 related to the operations of the additional device 5 based on each of the setting-purpose data files 416 and each of the command files 417.

The deletion portion 114 selectively deletes a function added by the function addition portion 111. Specifically, upon selection of a certain function from the list of the additional functions displayed on the teach pendant 2, the deletion portion 114 deletes the selected certain function.

Figure 3:
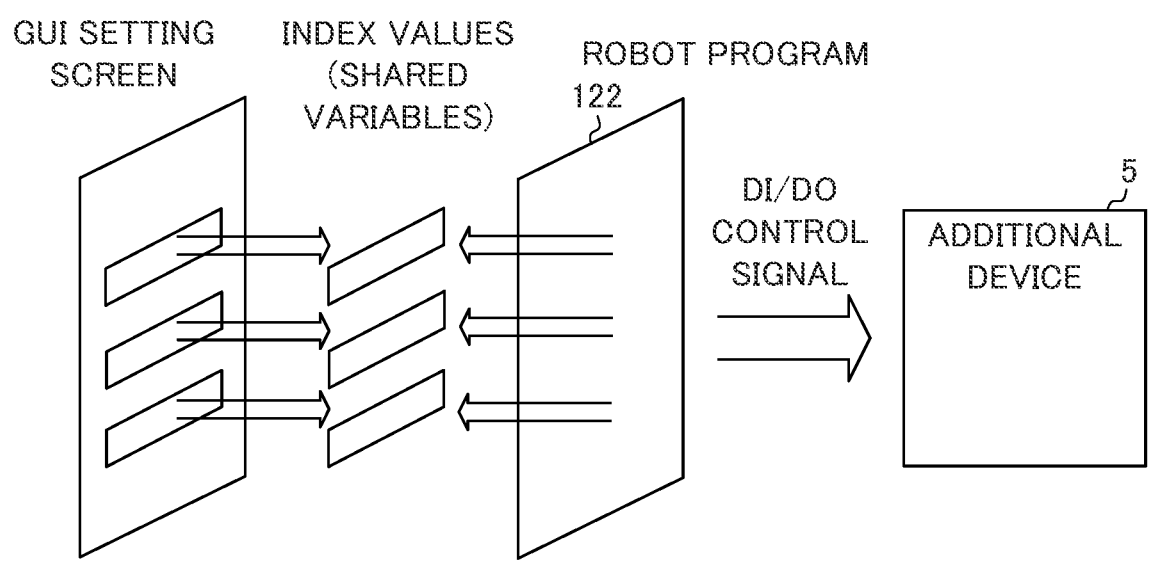
FIG. 3 is a view showing a setting example of a GUI setting screen and an additional device.

FIG. 3 is a view showing a setting example of a GUI setting screen and the additional device 5. The example in FIG. 3 shows the GUI setting screen for DI/DO (digital input and output) points used to control the additional device 5.

Index values are used to access the DI/DO points. The index values set on the GUI setting screen are set internally to shared variables on the non-volatile memory, and are stored on the non-volatile memory. The shared variables are respectively associated with setting items, and become effective dynamically and instantly upon a setting change.

The robot program 122 that causes input-and-output operations of the signals to the DI/DO points to take place can refer to the shared variables that respectively possess the index values to access the DI/DO points. With the insertion of the index values (shared variables), the GUI setting screen and the robot programs are associated with each other via the index values.

The robot program 122 associated with the GUI setting screen then sends a DI/DO control signal to the additional device 5. Therefore, the additional device 5 can be controlled through an operation on the newly added GUI setting screen.

According to the present embodiment, the robot controller 1 includes the memory unit 12 that stores the address table 123 that contains a plurality of start addresses for the additional system software files 412 each used to add a function to the system software 121 for the robot controller 1, and the function addition portion 111 that adds a function to the system software 121 based on the additional function file 41 stored in the external memory device 4. The function addition portion 111 uses an index value with respect to the address table 123 to acquire one of the start addresses for the additional system software files 412. Programs contained in the system software 121 and the additional system software files 412 each use a position-independent code based on relative addressing.

Upon installation of the system software 121, the robot controller 1 can therefore introduce a new additional function, without installing the system software 121 again. Although a robot controller can only use menus, screens, and the like that are specified beforehand, conventionally, for example, the robot controller 1 according to the present embodiment can therefore use menus, screens, and the like that are newly added.

The additional function file 41 constitutes an archive file that is a single file containing a plurality of programs and a plurality of data files. Therefore, the robot controller 1 can preferably introduce a file having an additional function.

The function addition portion 111 selectively adds a function to the system software 121 based on the additional function file 41. Therefore, the user can appropriately introduce a necessary additional function into the robot controller 1.

The additional function file 41 further contains identification information for functions to be added. Therefore, the robot controller 1 can discriminate an added function from other functions.

The additional function file 41 contains files that respectively configure new graphical user interface screens corresponding to the additional system software files. The robot controller 1 further includes the screen addition portion 112 that adds each of the new graphical user interface screens to the system software 121. Therefore, the robot controller 1 can add, to the system software 121, a new GUI screen corresponding to an additional function.

The additional function file 41 contains the setting-purpose data files 416 and the command files 417 each used to change system settings for the system software 121. The robot controller 1 further includes the setting change portion 113 that changes the system settings for the system software 121 based on each of the setting-purpose data files 416 and each of the command files 417. Therefore, the robot controller 1 can preferably change the system settings for the system software 121 having a new additional function.

The robot controller 1 further includes the deletion portion 114 that selectively deletes a function added by the function addition portion 111. Therefore, the robot controller 1 can preferably delete an additional function that is unnecessary for the user.

Although the embodiment of the present invention has been described, the present invention is not limited to the embodiment described above. The effects described in the present embodiment correspond to most preferable effects that are derived from the present invention, and that are listed merely. The effects of the present invention are not however limited to the effects described in the present embodiment.

EXPLANATION OF REFERENCE NUMERALS

1 Robot controller
2 Robot
3 Teach pendant
4 External memory device
5 Additional device
11 Control unit
12 Memory unit
41 Additional function file
111 Function addition portion
112 Screen addition portion
113 Setting change portion
114 Deletion portion

What is claimed is:

1. A robot controller that controls a robot, the robot controller comprising a processor and a memory that secures a region of shared variables corresponding to a function added to system software, the processor being configured to:
store an address table that contains a plurality of start addresses for additional system software files each used to add a function to system software for the robot controller; and
add a function to the system software on a basis of an additional function file stored in an external memory device,
wherein the processor uses an index value to acquire one of the start addresses for the additional system software files, and
programs contained in the system software and the additional system software files each use a position-independent code based on relative addressing, wherein
the additional system software files are each assigned a unique index value with respect to the address table, and
the additional system software files control the function added to the system software via the shared variables.

2. The robot controller according to claim 1, wherein the additional function file constitutes an archive file that is a single file containing a plurality of programs and a plurality of data files.

3. The robot controller according to claim 1, wherein the processor adds selectively a function to the system software based on the additional function file.

4. The robot controller according to claim 1, wherein the additional function file contains identification information for functions to be added.

5. The robot controller according to claim 1, wherein the additional function file contains files that respectively configure new graphical user interface screens corresponding to the additional system software files, and
the processor adds one of the new graphical user interface screens to the system software.

6. The robot controller according to claim 1, wherein the additional function file contains setting-purpose data files and command files each used to change system settings for the system software, and
the processor changes the system settings for the system software based on the setting-purpose data files and the command files.

7. The robot controller according to claim 1, wherein the processor selectively deletes the function added to the system software.

* * * * *